United States Patent
Conner et al.

(10) Patent No.: US 7,571,031 B2
(45) Date of Patent: Aug. 4, 2009

(54) SYSTEMS AND METHODS FOR BROADCASTING AN UNKNOWN AIRPORT ADVISORY

(75) Inventors: Kevin J Conner, Kent, WA (US); Yasuo Ishihara, Kirkland, WA (US)

(73) Assignee: Honeywell International Inc., Morristown, NJ (US)

( * ) Notice: Subject to any disclaimer, the term of this patent is extended or adjusted under 35 U.S.C. 154(b) by 386 days.

(21) Appl. No.: 11/469,802

(22) Filed: Sep. 1, 2006

(65) Prior Publication Data
US 2008/0059010 A1    Mar. 6, 2008

(51) Int. Cl.
*G06G 7/70* (2006.01)
(52) U.S. Cl. .............. 701/16; 701/9; 340/963
(58) Field of Classification Search ........ 701/9, 701/16, 18; 340/947, 951, 963
See application file for complete search history.

(56) References Cited
U.S. PATENT DOCUMENTS 6,980,892 B1  12/2005  Chen et al. ............... 701/9
7,132,960 B2  11/2006  Glover ..................... 340/945
2004/0044446 A1  3/2004  Staggs ..................... 701/16
2007/0138345 A1  6/2007  Shuster ................... 244/186
2007/0288129 A1  12/2007  Komer et al. ............. 701/3

*Primary Examiner*—Mark Hellner
(74) *Attorney, Agent, or Firm*—Black Lowe & Graham, PLLC

(57) ABSTRACT

Systems and methods for advising a flight crew member that an enhanced ground proximity warning system (EGPWS), for example, may continue to provide terrain alerts, cautions, warnings, or the like because an intended landing site for the aircraft is not recognized within a database of airports. An unknown airport advisory is generated and broadcast after the aircraft is in a landing configuration, when the aircraft is greater than a threshold distance from the nearest landing site in the database, but before the terrain alerts are broadcast. The pilot may actuate a "terrain inhibit" selection device after receiving the advisory. The inhibit device may deactivate or mute subsequent alerts generated by the EGPWS during that particular landing sequence.

18 Claims, 2 Drawing Sheets

SYSTEMS AND METHODS FOR BROADCASTING AN UNKNOWN AIRPORT ADVISORY

BACKGROUND OF THE INVENTION

A Terrain Awareness and Warning System (TAWS) is a system designed to alert pilots if their aircraft is in danger of making contact with a terrain feature. The terrain feature, by way of example, may be mountainous terrain, water terrain, or even a manmade structure.

One type of TAWS is an Enhanced Ground Proximity Warning System (EGPWS) that utilizes a digital terrain database stored in a computer memory on the aircraft. The EGPWS utilizes on-board computers in conjunction with long-range navigation systems such as global positioning systems (GPS), inertial navigation systems (INS), radio-dependent navigational systems, or some combination of the above, to periodically compare the aircraft's position relative to information in the digital terrain database.

One drawback of these systems is that the information in the digital terrain database may not recognize all possible or potential landing sites throughout the world. In such a situation, the aircraft may have occasion to land, either in intentionally or during an emergency, in areas that are not identified in the database. During intentional landings into unknown airports, for example, the current systems continuously and repeatedly broadcast at least some of the visual/audio alerts even though the aircraft has been intentionally placed into a proper landing configuration. Thus, a need exists for handling the alerts from the EGPWS when landing an aircraft at an unknown or unrecognized airport.

SUMMARY OF THE INVENTION

Systems and methods for advising a pilot or other member of a flight crew that continued alerts from an enhanced ground proximity warning system (EGPWS), for example, are to be expected because the nearest landing site in a database is not near the aircraft. The pilot is provided an audible or visual notification that the EGPWS (database) does not recognize a runway and/or airport within the particular geographic region where the aircraft is located. Accordingly, this notification that the aircraft is approaching an unknown airport helps to prepare the pilot for possible, additional alert messages from the EGPWS. In one embodiment, the pilot may activate a "terrain inhibit" switch after receiving the unknown airport audible or visual notification. Activation of this switch, or the like, causes the EGPWS to cease providing additional alert messages during that particular landing sequence of the aircraft.

In one aspect of the invention, a method of landing an aircraft includes the step of determining whether the aircraft is greater that a predetermined distance from the nearest landing site in a database. In addition when the after the aircraft is greater than the predetermined distance, generating an advisory comprising a human-perceptible broadcast providing information that the aircraft is landing at an unknown airport/runway.

As will be readily appreciated from the foregoing summary, the invention provides systems and methods for assisting pilots during the landing sequence of an aircraft toward a landing site that is not recognized in a database of information accessible by an EGPWS or other like system.

BRIEF DESCRIPTION OF THE DRAWINGS

The preferred and alternative embodiments of the present invention are described in detail below with reference to the following drawings.

DETAILED DESCRIPTION OF THE PREFERRED EMBODIMENT

Figure 1:
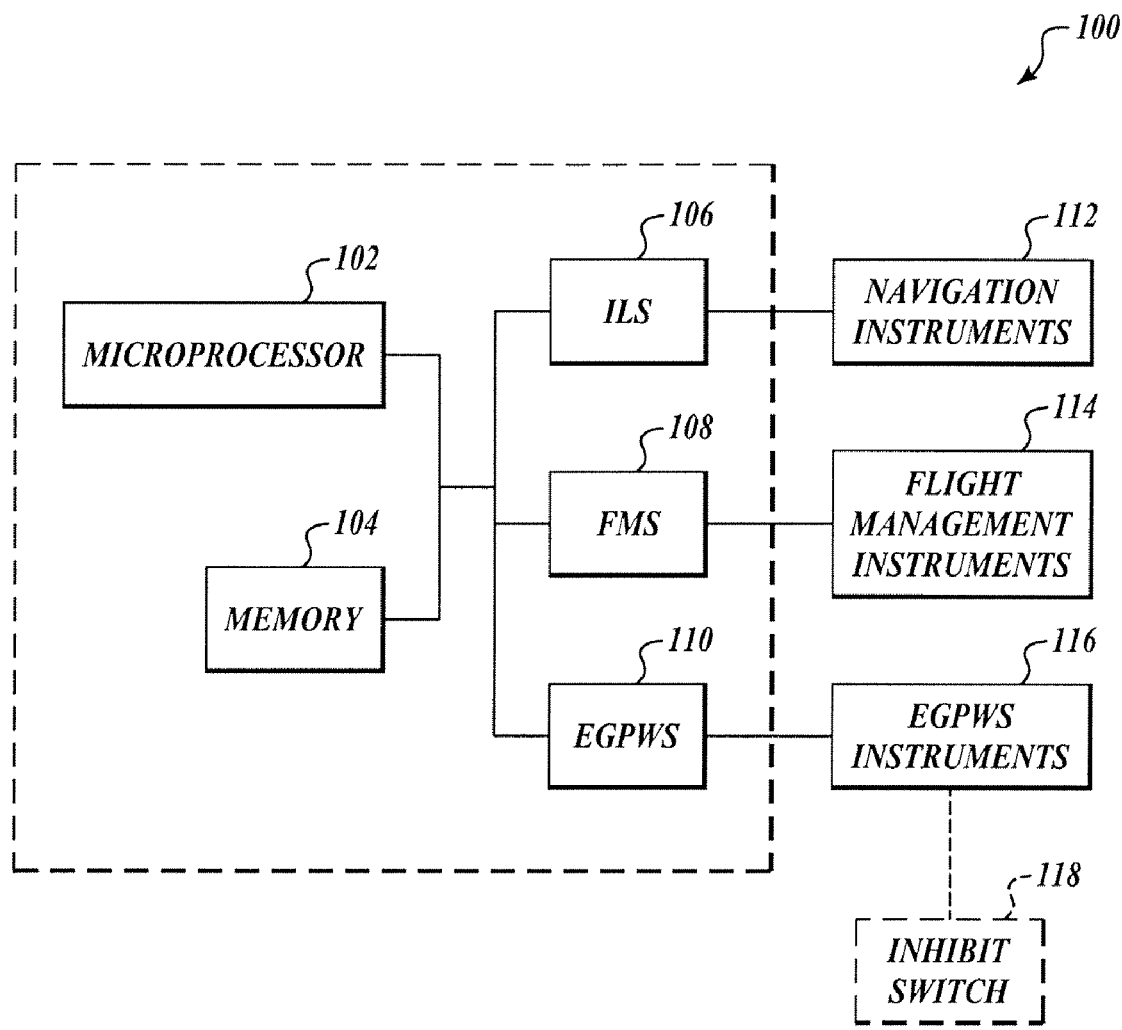
FIG. 1 is a diagram of a system for an aircraft according to one illustrated embodiment of the invention.

FIG. 1 shows a system 100 for an aircraft. The system 100 includes a processor 102 that is in communication with a memory 104. The processor 102 may also be in communication with an instrument landing system (ILS) 106, a flight management system (FMS) 108, an Enhanced Ground Proximity Warning System (EGPWS) 110 and/or or other data sources. In one embodiment, the ILS 106, the FMS 108, the EGPWS 110 and/or or other data sources gather and process information on the aircraft's configuration (e.g., landing configuration), position, etc. The EGPWS 110 may include a memory that is separate from the memory 104. In one embodiment, the ILS 106, the FMS 108, and the EGPWS 110 are coupled through an ARINC 429, ARINC 629 and/or other type of data bus that provides electrical and data characteristic protocols on how avionics equipment and systems should communicate with each other.

The EGPWS 110 communicates with the EGPWS instruments 116 to provide alerts and/or some other human-perceptible (i.e., audible and/or visual) notification when certain conditions arise. In one embodiment, when the aircraft is on a landing approach toward a runway and/or airport that is known, recognized, and/or identified in the EGPWS 110, the system 100 continually determines the position of the aircraft 102 relative to the information in the EGPWS 110. Based on this determination, the system 100, via the EGPWS instruments 116, may issue terrain alerts. In one embodiment of the invention, an "UNKNOWN AIRPORT" advisory is generated before any terrain alerts when the aircraft is approaching the runway or the airport that is not known, recognized, and/or identified in the EGPWS 110/memory 104.

Accordingly, the processor 102 provides at least one advisory that the aircraft is approaching the "UNKNOWN AIRPORT" after the aircraft has been placed in a landing approach configuration and has begun descending toward a landing site that is not known, recognized, matched, or does not correspond to a landing site stored in the memory 104 of the system 100 and/or in the separate memory of the EGPWS 110. By way of example, the landing approach configuration for a large, commercial aircraft may be determined by the system 100. For example, the FMS 108 may provide information on a position of the landing gear (e.g., up or down), a position of the wing trailing edge flaps (e.g., retracted, partially extended, or fully extended). Similarly, the ILS 106 may provide information on the position of the aircraft 102. Thus, the ILS 106 and the FMS 108 gather, provide, and exchange information with the EGPWS 110 to control the aircraft 102 during landing.

In one embodiment, the ground proximity alerts and the unknown airport advisory can be manually deactivated with an inhibit switch or button 118. In another embodiment, only the ground proximity alerts are manually deactivated with an inhibit switch or button 118.

Figure 2:
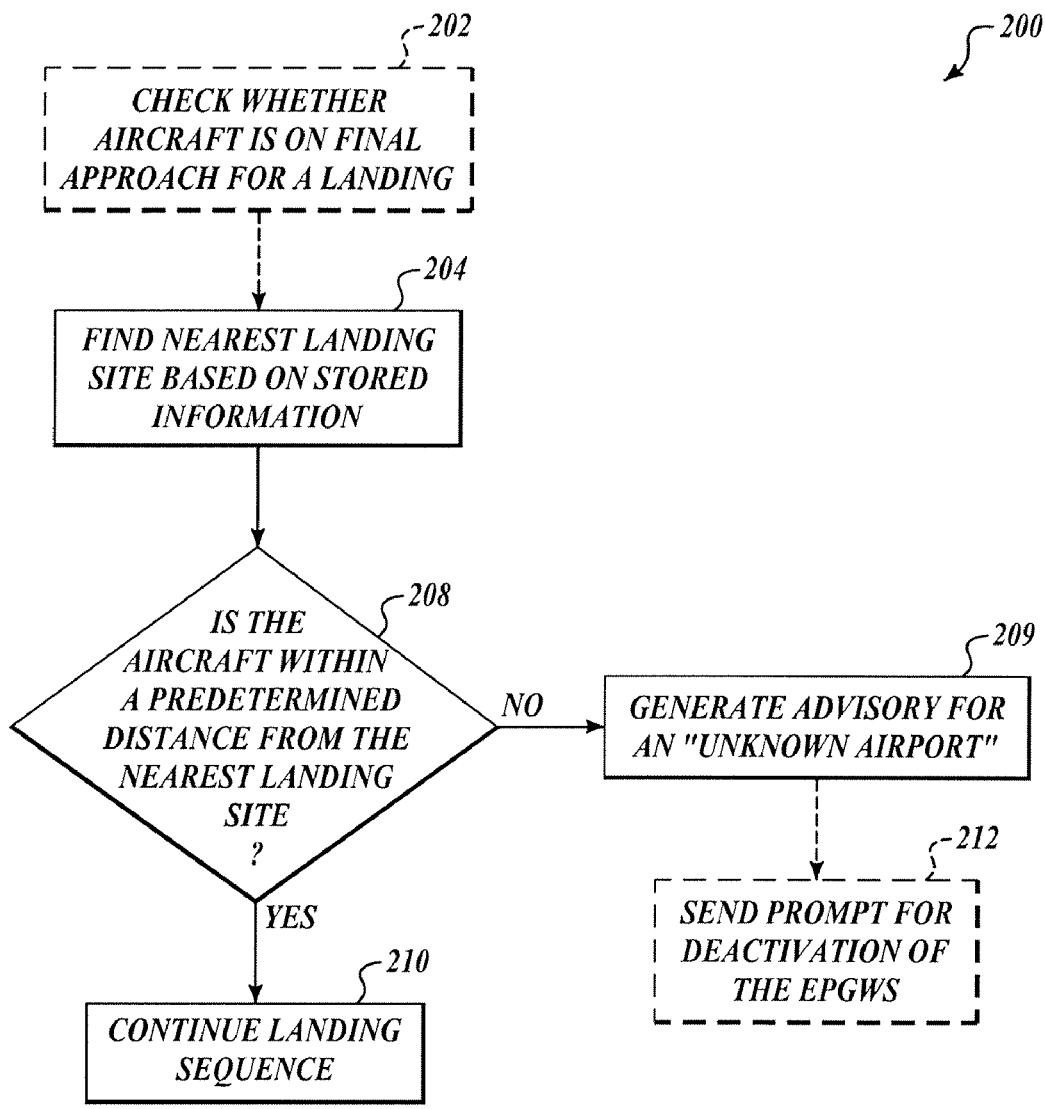
FIG. 2 is a flow diagram for a method of landing an aircraft according to one embodiment of the invention.

FIG. 2 is a flow diagram providing a method 200 performed by the system 100 of FIG. 1, according to one embodiment of the invention. At block 202, the system 100 may optionally determine when or if the aircraft 102 has been configured for approach (e.g. final approach) for an intended landing. As stated above, the landing approach configuration of the aircraft 102 for landing is determined by information received from any of the subsystems, such as the ILS 106, the FMS 108, the EGPWS 110 and/or discrete signals from control surfaces such as flaps or landing gear. If a landing is not intended, corrective action may be taken. For purposes of the invention, it will be understood that a landing is intended.

Even though the landing is intended, one exemplary situation is where the landing site is an unusual landing site that has not been researched by the pilots and is not stored in the system memory 104 or in the separate memory of the EGPWS 110. This situation may occur, for example, when the aircraft 102 has been diverted to an unusual landing site as a result of an on-flight emergency, bad or unexpected weather, etc.

First at block 204, the processor 102 finds the nearest landing site from those stored in memory 104 or memory associated with the EGPWS 110. Next at block 208, the processor 102 checks a relative distance between the nearest landing site (e.g., an airport or runway) in the database (memory 104) and the aircraft to determine if the landing site is greater than a predetermined distance of the aircraft. In one embodiment, the processor 102 determines whether the nearest landing site is greater than about twenty nautical miles from the aircraft. In another embodiment, the processor 102 determines whether the nearest landing site is greater than about fifty nautical miles from the aircraft. The predetermined distance may be less than twenty nautical miles or greater than fifty nautical miles depending on the type of aircraft, the geographic landing region, etc. By way of example, the process of determining the aircraft's distance from the nearest landing site includes the processor 102 performing comparisons of the aircraft's present geographic position as determined by a global positioning system (GPS) against coordinates for the nearest landing site. If the aircraft is within the predetermined distance from the nearest landing site, then at block 210 the aircraft continues on its landing sequence under standard or normal EGPWS operation.

If the nearest landing site is not within the predetermined distance from the aircraft, then at block 209 an "UNKNOWN AIRPORT" advisory is generated and broadcasted by the processor 102 via output devices, such as the EGPWS instruments 116. In this embodiment, the flight crew, such as the pilot, may now expect the EGPWS 110, via the EGPWS instruments 116, to provide continued and/or repeating alerts, and where the flight crew will henceforth appreciate that the information broadcast by the EGPWS 110 may not be accurate, up-to-date, and/or may not require any action. Consequently, the "UNKNOWN AIRPORT" advisory minimizes or eliminates confusion, annoyance, and/or misunderstandings by flight crew that the EGPWS 110 will be providing information that must be acted upon or that will require further review or consideration.

At block 212 and after the advisory is broadcast or issued, the system 100 may optionally prompt the flight crew to deactivate the EGPWS 110 to prevent expected terrain alerts. If the EGPWS 110 is not deactivated, then the EGPWS 110 would continue to output or otherwise provide terrain proximity information. Deactivation of the EPGWS 110, however may result in at least restricting if not preventing additional or subsequent terrain alerts. These functions performed by the EGPWS 110 and/or the EGPWS instruments 116 may be performed by another system or a combination of other systems in the aircraft 102.

While the preferred embodiment of the invention has been illustrated and described, as noted above, many changes can be made without departing from the spirit and scope of the invention. For example, the functions provided by the processor 102 may be implemented in other processors within the aircraft, such as the EGPWS 110. Accordingly, the scope of the invention is not limited by the disclosure of the aforementioned embodiments. Instead, the invention should be determined entirely by reference to the claims that follow.

The embodiments of the invention in which an exclusive property or privilege is claimed are defined as follows:

1. A method of advising a flight crew, the method comprising:
   a) determining whether the aircraft is greater than a predetermined distance from a nearest landing site; and
   b) when the aircraft is greater than the predetermined distance, generating an advisory comprising a human-perceptible broadcast providing information that the nearest landing site stored in a database is not recognized by a computer memory of the aircraft.

2. The method of claim 1, further comprising:
   determining whether the aircraft is in a landing configuration; and
   performing a) and b) if the aircraft is determined to be in a landing configuration.

3. The method of claim 2, wherein determining whether the aircraft is in the landing configuration includes receiving a signal that the landing gear of the aircraft has been lowered.

4. The method of claim 1, wherein determining whether the aircraft is greater than a predetermined distance from the nearest landing site includes determining whether the aircraft is greater than about twenty nautical miles from the nearest landing site.

5. The method of claim 1, wherein determining whether the aircraft is greater than the predetermined distance from the nearest landing site includes determining whether the aircraft is greater than the predetermined distance from a runway of an airport, where information on the runway is stored in the computer memory of the aircraft.

6. The method of claim 1, further comprising generating a signal from an ground proximity warning system.

7. The method of claim 1, wherein generating the advisory includes generating an audible advisory.

8. The method of claim 1, wherein generating the advisory includes generating a visual advisory.

9. The method of claim 1, wherein generating the advisory occurs at least once.

10. The method of claim 1, wherein generating the advisory includes generating the advisory before one or more terrain alerts are generated.

11. A system on an aircraft usable during landing, the system comprising:
   a computer memory for storing a plurality of landing sites; and
   a processor operable with the memory, the processor comprising:
      a first component for determining a landing site nearest the aircraft based on the plurality of landing sites stored in the memory;
      a second component for determining whether the aircraft is greater than a predetermined distance from the determined nearest landing site; and
      a third component for generating an advisory when the second component determines that the nearest landing site is greater than the predetermined distance and when the nearest landing site stored in the memory is not recognized.

12. The system of claim 11, wherein the processor comprises a fourth component for determining if the aircraft is in a landing configuration, wherein first, second and third components are operable if the fourth component determines the aircraft is in a landing configuration.

13. The system of claim 11, wherein the at least one airport or runway stored in the memory includes terrain topographies for geographic regions that are in a vicinity of the at least one airport or runway.

14. The system of claim 11, wherein the advisory is a human-perceptible signal.

15. The system of claim 11, wherein the human-perceptible signal is a visual advisory.

16. The system of claim 11, wherein the advisory occurs at least once during a landing sequence of the aircraft.

17. The system of claim 11, wherein the advisory is broadcast when the aircraft is greater than about twenty nautical miles from a nearest airport.

18. The system of claim 11, wherein the processor and the memory are located in a Terrain Alert and Warning System.

* * * * *